(12) United States Patent
Kishore et al.

(10) Patent No.: US 8,412,860 B2
(45) Date of Patent: *Apr. 2, 2013

(54) INPUT/OUTPUT (I/O) VIRTUALIZATION SYSTEM

(75) Inventors: Karagada R. Kishore, Saratoga, CA (US); Kiron Malwankar, Saratoga, CA (US); Peter E. Kirkpatrick, San Francisco, CA (US)

(73) Assignee: Fusion-IO, Inc., Salt Lake City, UT (US)

( * ) Notice: Subject to any disclaimer, the term of this patent is extended or adjusted under 35 U.S.C. 154(b) by 87 days.

This patent is subject to a terminal disclaimer.

(21) Appl. No.: 12/751,543

(22) Filed: Mar. 31, 2010

(65) Prior Publication Data

US 2011/0029695 A1  Feb. 3, 2011

Related U.S. Application Data

(60) Provisional application No. 61/165,772, filed on Apr. 1, 2009.

(51) Int. Cl.
  *G06F 3/00* (2006.01)
  *G06F 13/12* (2006.01)
  *G06F 13/38* (2006.01)

(52) U.S. Cl. ............................. 710/9; 710/64

(58) Field of Classification Search .......... 710/9
  See application file for complete search history.

(56) References Cited

U.S. PATENT DOCUMENTS

| | | | |
|---|---|---|---|
| 7,188,209 B2 | 3/2007 | Pettey et al. | |
| 7,327,748 B2 | 2/2008 | Montalvo et al. | |
| 7,492,723 B2 | 2/2009 | Boyd et al. | |
| 7,506,094 B2 | 3/2009 | Boyd et al. | |
| 7,529,860 B2 | 5/2009 | Freimuth et al. | |
| 7,633,955 B1 * | 12/2009 | Saraiya et al. | 370/401 |
| 7,752,376 B1 * | 7/2010 | Johnsen et al. | 710/311 |
| 2004/0003141 A1 | 1/2004 | Matters et al. | |
| 2006/0195620 A1 | 8/2006 | Arndt et al. | |
| 2006/0230181 A1 * | 10/2006 | Riley | 709/239 |
| 2006/0242330 A1 | 10/2006 | Torudbakken et al. | |
| 2006/0242352 A1 | 10/2006 | Torudbakken et al. | |
| 2008/0126648 A1 * | 5/2008 | Brownlow et al. | 710/260 |

(Continued)

OTHER PUBLICATIONS 2380.2.86PCT, Application No. PCT/US2010/029433, International Preliminary Report on Patentability, Jun. 2, 2010.

(Continued)

*Primary Examiner* — Idriss N Alrobaye
*Assistant Examiner* — Ronald Modo
(74) *Attorney, Agent, or Firm* — Kunzler Law Group, PC

(57) ABSTRACT

An Input/Output (IO) Virtualization (IOV) system couples or connects multiple host computers and IO devices to a managed transport fabric to provide IO virtualization. The host computers may run any operating system to provide a virtualized environment for guest operating systems. The host interface to the IOV system is PCI-Express (PCIe). The IO devices are PCIe based to provide maximum compatibility with industry standard devices, but are not so limited. The IOV system comprises a management central processor unit (MCPU) coupled to transport fabric. The IOV system comprises device interfaces coupled to the transport fabric and to independent input/output (IO) devices. Each device interface couples to the IO device of the independent IO devices. The IOV system comprises host interfaces coupled to the transport fabric. Each host interface couples to a host computer of the independent host computers and exposes functions of the independent IO devices to the host computer.

63 Claims, 3 Drawing Sheets

U.S. PATENT DOCUMENTS

| | | | |
|---|---|---|---|
| 2008/0195756 A1* | 8/2008 | Galles | 709/245 |
| 2008/0270599 A1* | 10/2008 | Tamir et al. | 709/224 |
| 2008/0288644 A1 | 11/2008 | Gilfix et al. | |
| 2008/0288661 A1 | 11/2008 | Galles | |
| 2008/0288664 A1 | 11/2008 | Pettey et al. | |
| 2009/0248947 A1 | 10/2009 | Malwankar et al. | |
| 2010/0115174 A1* | 5/2010 | Akyol et al. | 710/316 |
| 2011/0029695 A1 | 2/2011 | Kishore et al. | |
| 2011/0106981 A1 | 5/2011 | Watkins et al. | |

OTHER PUBLICATIONS 2380.2.86PCT, Application No. PCT/US2010/029433, International Search Report and Written Opinion, Jun. 2, 2010.

Menon, A., "Optimizing Network Virtualization in Xen", USENIX 2006 Annual Technical Conference, May 30-Jun. 3, 2006, pp. 23, http://www.cs.uiowa.edu/-gjordans/Papers/xen-net-opt.pdf.

Virtensys, "Virtensys First to Deliver PCI Express-Based I/O Virtualization Switches to Customers", Feb. 23, 2009, http://www.virtensys.com/news-events/pr/pr_20060600_Virtensys-Demonstrates-PCI-Express-Based-IO-Virtualization.php.

2380.2.74, U.S. Appl. No. 12/790,920, Office Action, May 1, 2012.

2380.2.74, U.S. Appl. No. 12/790,920, Office Action, Sep. 4, 2012.

2380.2.74, U.S. Appl. No. 12/790,920, Notice of Allowance, Dec. 19, 2012.

2380.2.74, U.S. Appl. No. 12/790,920, Office Action, Sep. 30, 2011.

2380.2.87, U.S. Appl. No. 12/790,921, Office Action, May 1, 2012.

2380.2.87, U.S. Appl. No. 12/790,921, Office Action, Sep. 30, 2011.

* cited by examiner

INPUT/OUTPUT (I/O) VIRTUALIZATION SYSTEM

RELATED APPLICATIONS

This application claims the benefit of U.S. Patent Application No. 61/165,772, filed Apr. 1, 2009.

This application is related to U.S. patent application Ser. No. 12/265,695, filed Nov. 5, 2008.

This application is related to U.S. patent application Ser. No. 12/353,659, filed Jan. 14, 2009.

TECHNICAL FIELD

The disclosure herein relates generally to network architectures and, more particularly, a virtualization system that couples host computers and multiple IO devices to provide IO virtualization.

BACKGROUND

Conventional technologies include a standard known as single-root input/output virtualization (SR-IOV) for PCI Express® (PCIe) devices. The SR-IOV allows multiple operating systems running simultaneously within a single computer to natively share PCIe devices by providing native input/output (IO or I/O) virtualization in PCIe topologies where there is a single root complex. The single root complex typically indicates a central processing complex with a single chipset, where the PCIe root complex resides. Therefore, SR-IOV allows multiple guest operating systems running in a virtual machine environment on a single processing complex to access multiple functions in a SR-IOV capable device.

Multi-root IOV (MR-IOV) has also been specified, which builds on SR-IOV to provide native I/O virtualization in topologies in which multiple root complexes share a PCIe hierarchy. The MR-IOV, however, requires implementation at the fabric, endpoint, and system levels that has not been realized to date.

Additionally, conventional technologies include proprietary systems that have been developed to implement IO virtualization. However, these systems do not provide native, transparent PCIe connections to the hosts and IO devices in the system and, further, require proprietary IO resource modules or drivers to run on the hosts.

Fiber Channel over Ethernet (FCoE) is another conventional technology that allows for tunneling storage traffic using a Fiber Channel protocol to be encapsulated in ethernet frames and transported on an ethernet fabric. However, extensive infrastructure replacement will be necessary to implement FCoE, like required replacement of the switching fabric, IO devices, and drivers associated with the client-server (ethernet) and storage (fiber channel) networks.

Conventional systems also include ExpressEther, which is a system architecture that provides a mechanism to transport PCIe traffic over an ethernet fabric. However, the system does not provide sharing of PCIe devices at the function level, but only serial assignment of an entire device to a given host. Moreover, the system does not provide for host-to-host communications.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

An Input/Output (IO) Virtualization (IOV) system is described herein that couples or connects multiple host computers and multiple IO devices to a managed transport fabric to provide IO virtualization and host-to-host communication services to the host computers. The host computers may be of any type or size, and may run any operating system or hypervisor to provide a virtualized environment for guest operating systems. The host interface to the IOV system is PCI-Express (PCIe), which is available on nearly every modern computer, particularly server class machines. The IO devices are PCIe based to provide maximum compatibility with industry standard devices, but are not so limited.

In the following description, numerous specific details are introduced to provide a thorough understanding of, and enabling description for, embodiments of the present invention. One skilled in the relevant art, however, will recognize that these embodiments can be practiced without one or more of the specific details, or with other components, systems, etc. In other instances, well known structures or operations are not shown, or are not described in detail, to avoid obscuring aspects of the disclosed embodiments.

Figure 1:
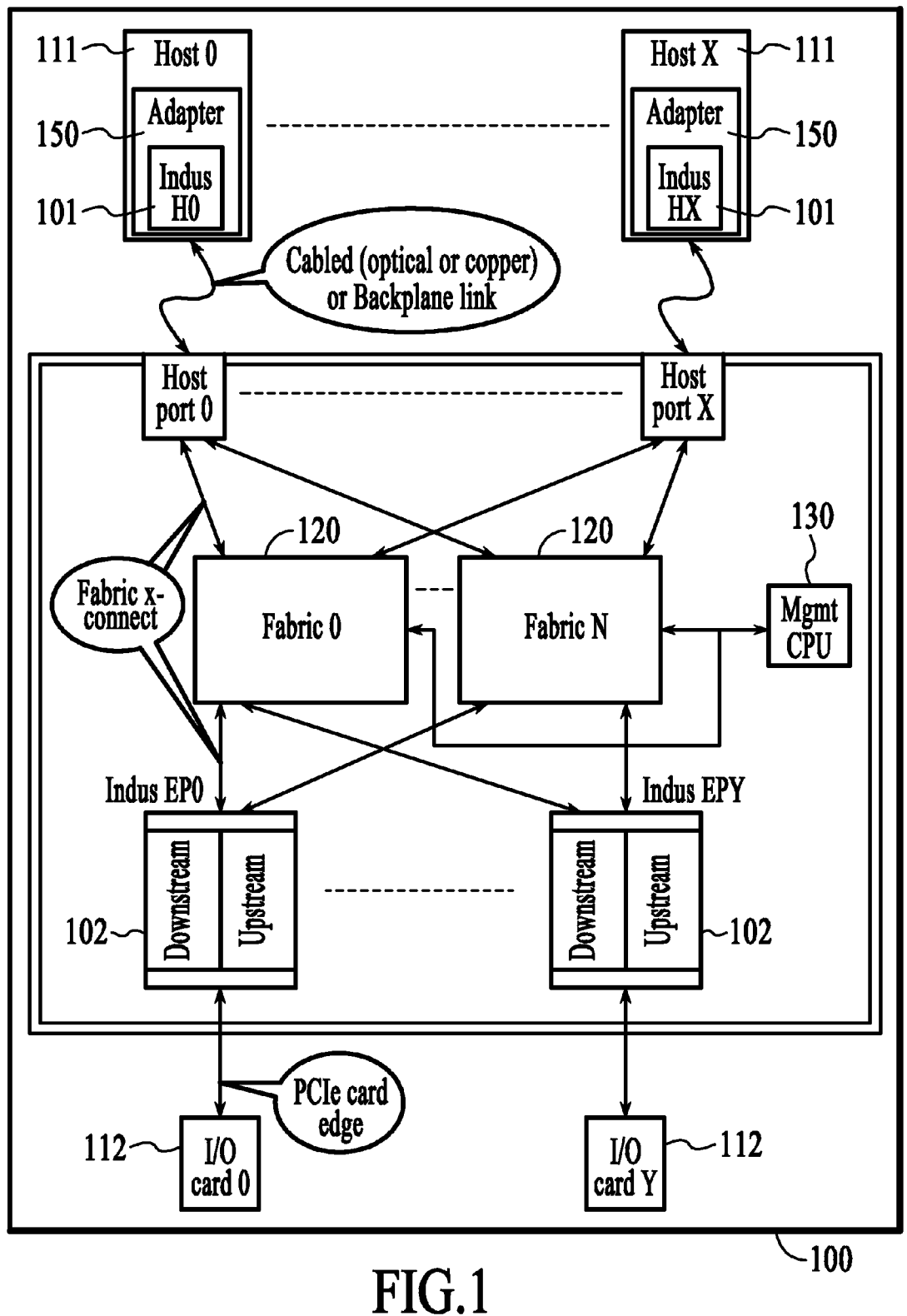
FIG. 1 is a block diagram of the Input/Output Virtualization (IOV) System, under an embodiment.

FIG. 1 is a block diagram of the Input/Output Virtualization (IOV) System 100, under an embodiment. The IOV system 100 comprises a number of IOV interface devices 101-102. The IOV interface devices of an embodiment include host interface devices 101 coupled or connected to host computers 111, where at least one host interface device 101 is coupled or connected to at least one host computer 111 (e.g., Indus H0, Indus H1 . . . Indus HX is coupled or connected to Host 0, Host 1 . . . Host X, respectively (where X is any number)). The IOV interface devices of an embodiment include endpoint interface devices 102 coupled or connected to IO devices 112, where at least one endpoint interface device 102 is coupled or connected to at least one IO device 112 (e.g., Indus EP0, Indus EP1 . . . Indus EPY is coupled or connected to IO device 0, IO device 1 . . . IO device Y, respectively (where Y is any number)).

A transport fabric 120 provides a scalable, low-latency, high-bandwidth interconnection fabric for coupling or connecting the host computers 111, the IO devices 112, and the IOV interface devices 101-102 to the system. Various transport fabric technologies can be used for the transport fabric 120, including Ethernet, InfiniBand, and/or other proprietary fabric solutions to name a few. For ease of use, low cost, and compatibility purposes, the IOV system 100 of an embodiment uses low-latency Ethernet based devices to implement the transport fabric 120. A management CPU (MCPU) 130 of an embodiment couples or connects directly to the transport fabric 120 using a fabric-native interface, and IOV interface functionality between the transport fabric 120 and the MCPU 130 is implemented in software and/or other components of the MCPU 130 and/or the transport fabric 120.

The host interface devices 101 of an embodiment can be a component of an adapter 150, but are not so limited. The adapter 150, when present, may take the physical form of a PCIe card in a rackmount server or a mezzanine card in a blade server. The adapter functionality may be further integrated onto a host motherboard. The host interface device 101 provides a standard PCIe interface to the host computer 111, and a multi-link interface to the transport fabric 120.

Figure 2:
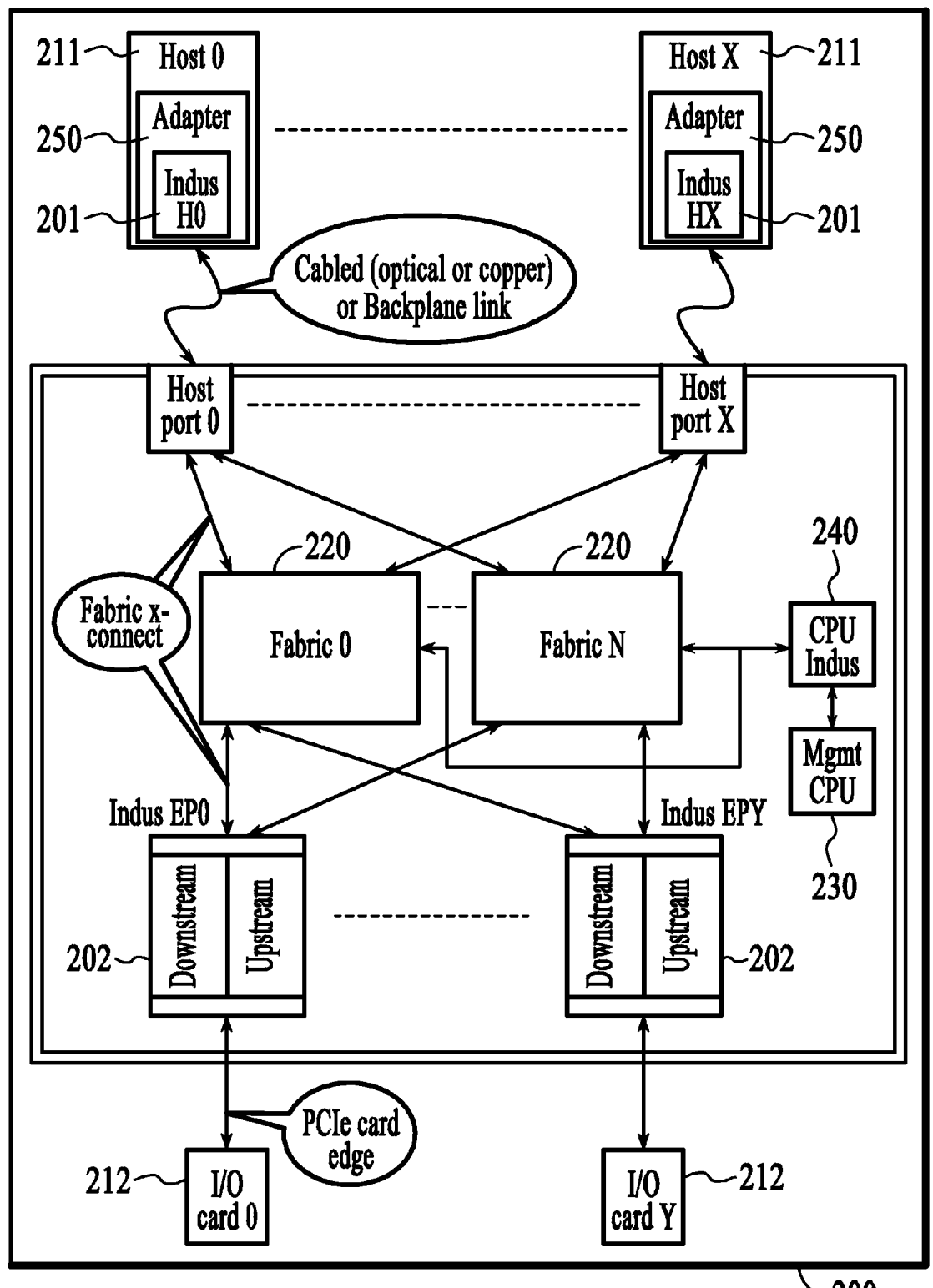
FIG. 2 is a block diagram of the IOV system, under an alternative embodiment.

FIG. 2 is a block diagram of the Input/Output Virtualization (IOV) System 200, under an alternative embodiment. The IOV system 200 comprises a number of IOV interface devices 201-202. The IOV interface devices of an embodiment include a management interface device 240 coupled or connected to a MCPU 230. The IOV interface devices of an embodiment also include host interface devices 201 coupled or connected to host computers 211, where at least one host interface device 201 is coupled or connected to at least one host computer 211 (e.g., Indus H0, Indus H1 . . . Indus HX is coupled or connected to Host 0, Host 1 . . . Host X, respectively (where X is any number)). Furthermore, the IOV interface devices of an embodiment include endpoint interface devices 202 coupled or connected to IO devices 212, where at least one endpoint interface device 202 is coupled or connected to at least one IO device 212 (e.g., Indus EP0, Indus EP1 . . . Indus EPY is coupled or connected to IO device 0, IO device 1 . . . IO device Y, respectively (where Y is any number)).

A transport fabric 220 provides a scalable, low-latency, high-bandwidth interconnection fabric for coupling or connecting the MCPU, the host computers 211, the IO devices 212, and the IOV interface devices 201-202 to the system. Various transport fabric technologies can be used for the transport fabric 220, including Ethernet, InfiniBand, and/or other proprietary fabric solutions to name a few. For ease of use, low cost, and compatibility purposes, the IOV system 200 of an embodiment uses low-latency Ethernet based devices to implement the transport fabric 220.

The host interface devices 201 of an embodiment can be a component of an adapter 250, but are not so limited. The adapter 250, when present, may take the physical form of a PCIe card in a rackmount server or a mezzanine card in a blade server. The adapter functionality may be further integrated onto a host motherboard. The host interface device 201 provides a standard PCIe interface to the host computer 211, and a multi-link interface to the transport fabric 220.

Generally, the host interface device exposes multiple independent PCI devices to the host computer. These PCI devices are exposed as a proxy device, or proxy, of a function within the host interface device. The PCI-Express proxy device is a device which is coupled between a host server's PCI-Express subsystem and a second PCI-Express subsystem (the shared subsystem). The shared subsystem is managed by a PCI-Express manager. The shared subsystem will comprise one or more endpoint devices which provide services such as communications interfaces or storage capacity. The proxy device may implement multiple functions, each of which can be a proxy representing a different endpoint function (EPF) in endpoint devices of the shared subsystem.

The PCI-Express proxy device exposes the functionality of an endpoint function to the host to which the proxy device is accessible. The proxy device appropriately translates all accesses intended for the endpoint into transactions that may be transferred across the switch fabric of the shared subsystem. In this way, the functionality of the endpoint is accessible to the host using standard and existing PCI-Express software.

The proxy provides access to the endpoint device by storing information to identify local and remote resources. As the proxy comprises a PCI function on the local host bus, the local information that it stores includes a PCI identifier in the domain of the local host. The PCI identifier of an embodiment is a bus/device/function (BDF) number. The BDF identifies either the requester or completer in the PCIe split-transaction protocol. The BDF is unique within a single domain, but if a resource is accessed from multiple domains, the BDF is modified so as not to allow duplicate identifiers.

Additionally, the proxy stores information to identify the remote endpoint function. This information includes an EPF identifier, which may be a PCI identifier (e.g., BDF) in the domain of the shared subsystem, or an identifier of a different format. The information to identify the remote EPF also includes the destination address of the device interface corresponding to the EPF, and the destination address of the manager. Furthermore, the information to identify the remote EPF includes resource identifiers such as a memory range identifier (indicating a specific PCI base address register (BAR) in the endpoint device), and a related mechanism to determine the identifier per transaction.

The proxy further handles routing of transactions between the host, the endpoint function, and the MCPU. Depending on the type of endpoint function and the type of transaction, the proxy determines the destination of requests from the host, the destination of requests being either the endpoint function or the MCPU, but the embodiment is not so limited.

In an embodiment, the proxy reserves local resources (e.g., BDF, memory range, I/O range, etc) in the host domain. In so doing, the proxy device provides a placeholder device to reserve resources in the host domain during PCI enumeration and discovery. These resources include a PCI identifier, and the PCI identifier of an embodiment is one or more of a BDF, a memory space reservation, an IO space reservation, an interrupt request identifier, and a PCI capability, to name a few examples. The resources reserved can be a superset of the resources required by any EPF used in the system or, alternatively, a subset of the resources required by any EPF used in the system. Upon assignment of an EPF to a proxy device, the host rescans the PCI-Express subsystem and discovers the EPF resource requests. The resources requested by the EPF fit within the space reserved by the proxy, which prevents extensive reallocation of resources by the host. When the EPF is unassigned from the host, the proxy may be re-programmed to the original state so that resources are reserved during subsequent bus scans.

When a function is assigned to a specific host computer, the proxy for that function is populated with configuration information from the actual function. Upon population of the proxy, the IOV system indicates a hot-plug event to the host computer. Upon recognizing the hot-plug event and discovering the function proxy, the host computer loads the appropriate driver for the function. Configuration accesses to the proxy can be directed to the MCPU which controls configuration of the function and updates the proxy with current configuration status. Depending on the type of endpoint device, the mode of operation of the endpoint device, and the type of transaction, configuration accesses to the proxy may be directed to the EPF itself. The IO accesses to the proxy are sent directly to the IO device via the transport fabric to maintain a low-latency, high-throughput interface.

The IOV host interface device may also include an actual PCI device to provide a host-to-host communication function. This function allows hosts to communicate directly with other hosts via various methods. Methods may include a memory-oriented scheme and/or a connection-oriented scheme. For example, the mechanism of an embodiment maps a region of IO memory in one host to the physical memory in another. Based on this mechanism, connection-oriented or connectionless communication channels may be implemented. The function includes a direct memory access (DMA) engine, to offload the communication load from host CPUs.

The IO devices or other endpoint devices interface to the IOV system via the standard PCIe interface. The PCIe interface couples or connects to an IOV endpoint interface device (e.g., Indus EPx). The endpoint interface device provides the encapsulation and/or decapsulation of PCIe traffic such that it may traverse the transport fabric between the IO devices, the MCPU and the host computers. The transport fabric coupling or connection generally comprises multiple links to provide high bandwidth.

The IO devices can include devices having any number of different capabilities, single-function devices, multi-function devices, MR-IOV devices, and/or SR-IOV capable devices. SR-IOV indicates a standard developed by the PCI-SIG to allow multifunction devices to be shared amongst multiple guest operating systems on a single host, in a virtual machine (hypervisor) environment. In the IOV system of an embodiment, single function devices may be assigned to a single host only, with privileged control allowed for that host. Multifunction devices may be shared across multiple hosts with separate physical functions controlled by drivers running on the hosts, while the MCPU monitors the device status. SR-IOV devices may be shared across multiple hosts with the physical function (function 0) controlled by the privileged driver running on the MCPU, and the virtual functions assigned to various hosts and controlled by non-privileged drivers running on those hosts.

The transport fabric and IOV interface device logic provide a robust interconnect that provides the reliability and quality of service expected by standard PCIe devices, for example, error-free, in-order, exactly-once delivery of packets with relatively low loss under relatively high system load. To achieve this, the transport fabric interface logic closely emulates the functionality of the PCIe link layer. This emulation includes the error checking, ACK/NAK protocol, packet retransmission, quality of service (priority), and extends the link layer with congestion management capabilities.

The use of an Ethernet transport fabric in an embodiment allows for the attachment of many hosts and IO devices. Ethernet switches are denser (more ports) and higher bandwidth than PCIe switches. Therefore, the IOV system can support more ports, on the order of 24-64 ports. This port count can be maintained for even very high bandwidth ports, as described below.

The transport fabric of an embodiment provides high-bandwidth interfaces to host and device ports. PCIe interfaces have a wide range of possible bandwidths, with links comprising one or more lanes, and lanes operating at various speeds. The slowest PCIe link possible is a single lane operating at 2.5 Gb/s (PCIe 1.0×1), for a total link bandwidth of 2.5 Gb/s and a data throughput of 2.0 Gb/s (250 MB/s) after encoding overhead is removed. The fastest link currently available has sixteen lanes operating at 5.0 Gb/s (PCIe 2.0× 16), providing 80 Gb/s of link bandwidth and 64 Gb/s (8 GB/s) of data throughput. As a single fabric interface may provide less bandwidth than required to support a fast PCIe port, the IOV interface devices provide the capability to distribute the load across multiple transport fabric links. In order to maintain the maximum port count available in the transport fabric (given by the number of ports on a single fabric switch), multiple fabric switches are used in parallel to support these multi-link interfaces. For example, while a single 24-port fabric switch with 10 Gb/s ports can support 24 10 Gb/s interfaces, a combination of two 24-port switches can support 24 20 Gb/s interfaces. Similarly, a combination of four 64-port switches can support 64 40 Gb/s interfaces. This concept is called 'striping' and, for PCIe fabrics of the IOV system, this concept has been applied to an ethernet fabric. The interfaces may be distributed between hosts, IO devices, and the MCPU.

Figure 3:
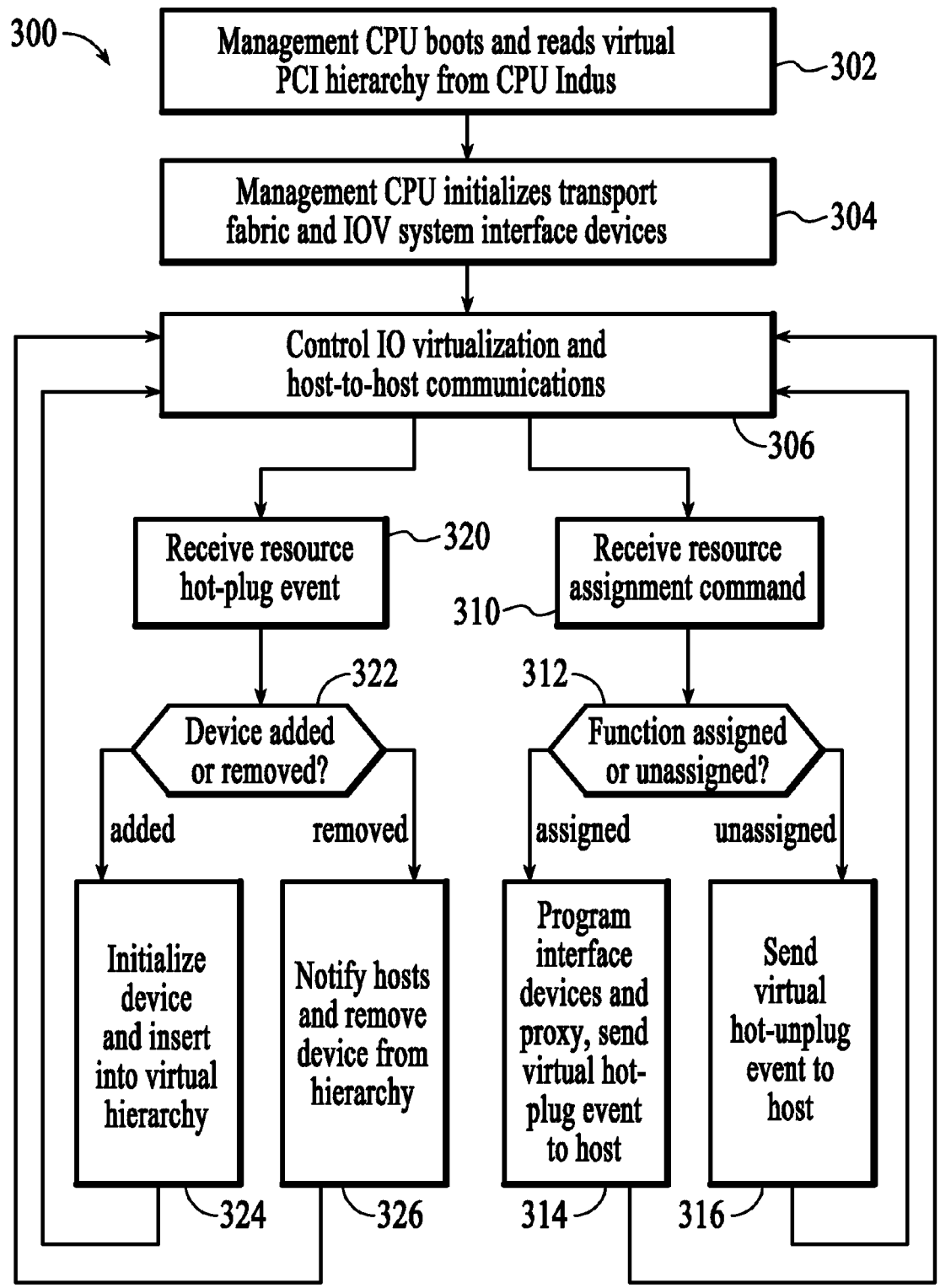
FIG. 3 is a flow diagram for controlling communications between host computers and IO devices, under an embodiment.

FIG. 3 is a flow diagram for controlling 300 communications between host computers and IO devices, under an embodiment. Upon system startup, the MCPU boots 302 and loads a virtual PCI hierarchy from the management interface device, then initializes 304 the transport fabric and IOV system interface devices coupled or connected to the system. The IOV interface devices provide an encapsulation and/or decapsulation protocol for PCIe traffic to traverse the transport fabric, as described above.

Using the transport fabric to access the IO devices, the MCPU then uses the standard PCI discovery process to discover and enumerate all of the PCIe resources coupled or connected to the system. Generally, all resource discovery can be treated as hot-plug (e.g., at startup, devices already connected will send hot-plug events). When a resource is hot-plugged into the system, it is inserted into the virtual hierarchy and initialized. The MCPU initializes the PCIe devices, and runs a privileged driver for each to control the PCIe device. The privileged driver has complete control over the physical PCIe device, including power management and reset capability. The MCPU similarly discovers and controls PCIe devices that are hot-plugged to the system during live operation. The IOV system once initialized couples or connects multiple host computers and multiple IO devices to a managed transport fabric to provide and control 306 IO virtualization and host-to-host communication services to the host computers.

More specifically, communication control operations of an embodiment continue with the IOV system providing and controlling 306 IO virtualization and host-to-host communication services to the host computers using resource assignment commands and resource hot-plug events. In an embodiment, a resource assignment command is received 310, and a determination is made 312 whether the corresponding function is assigned or unassigned. When the function is assigned, associated interface devices and proxies are programmed and a virtual hot-plug event is sent 314 to the host. When the function is unassigned, a virtual hot-unplug event is sent 316 to the host.

Operation continues in an embodiment when a resource hot-plug event is received 320. In response, a determination is made 322 whether a device is being added or removed. When a device is being added, the device is initialized and inserted 324 into the virtual hierarchy. When a device is being removed, the MCPU is notified and the device is removed 326 from the virtual hierarchy.

The IOV system of an embodiment allows for virtualization of multifunction (including non-MR aware) PCIe devices across multiple hosts while utilizing the native device drivers. The IOV system further allows native host to host communications across the interconnect fabric, along with the IOV traffic. Additionally, the system provides native PCIe interfaces to hosts and IO devices in a scalable fashion (many high-bandwidth ports).

The IOV system implements a flexible and efficient architecture for datacenter computer interconnects. The IOV system architecture, for example, provides access to multiple IO resources over a single host connection which replaces multiple independent dedicated network connections. The convergence of these connections over a single 'wire' reduces costs and cabling complexity in the datacenter.

The ability to provision IO resources at a fine level of granularity using the IOV system gives users an efficient way to assign the resources that are necessary for a given compute job. Resources may be allocated according to service level agreements or allocated at the time of use. This prevents the need to install IO resources that may be underutilized by a given host.

The ability to centralize IO resources allows for efficient high-availability configurations. For example, if the host controlling a given resource fails, the resource can be reassigned to a working host and use of the resource can resume.

The IO address virtualization provided by the IOV system allows server hardware to be added or changed without affecting network configuration settings for access to other hosts, access to storage devices, and security. This simplifies network maintenance as servers are added, removed, or upgraded.

Conventional PCIe based systems are limited in scalability, and systems connected through standard PCIe switch silicon are severely limited in port count, limiting the number of hosts and IO devices that may be connected to the system. The IOV system provides the virtualization of a standard, scalable transport fabric to provide a scalable and flexible interconnection topology for many hosts and IO devices. This also allows the IOV system of an embodiment to leverage existing standards-based devices and the drivers provided by the device vendors.

The IOV system provides for a centralized entity to manage the assignment of IO functions to hosts and host-to-host communication channels. This capability allows datacenter managers to control the amount of IO allocated to individual hosts, ensuring that datacenter resources are available when desired and are used efficiently. The IOV system also provides a high-bandwidth, low-latency host-to-host communication capability. Providing this capability at the first tier (closest to the host) of interconnection is critical to achieving low latency and high throughput, while integration at this level reduces the cost of implementation.

The IOV system allows host (server) computers to be procured and installed without specific IO resources, and can access the necessary IO resources from the IOV network. Similarly, IO resources can be procured as necessary and installed in the system independently of computer resources (CPU and Memory). Thus, the upgrade cycles for compute and IO resources can be separated, reducing procurement cost and complexity.

Embodiments described herein include a system comprising: a management central processor unit (MCPU) coupled to transport fabric; a plurality of device interfaces coupled to the transport fabric and to a plurality of independent input/output (IO) devices, wherein each device interface couples to the IO device of the plurality of independent IO devices; and a plurality of host interfaces coupled to the transport fabric, wherein each host interface couples to a host computer of a plurality of independent host computers and exposes functions of the plurality of independent IO devices to the host computer.

The plurality of independent IO devices of an embodiment is coupled to the transport fabric using a Peripheral Component Interconnect Express (PCIe) interface.

The MCPU of an embodiment is connected directly to the transport fabric.

The MCPU of an embodiment is coupled to the transport fabric with a management interface.

The MCPU of an embodiment initializes the transport fabric, the device interfaces, and the host interfaces.

The MCPU of an embodiment initializes the device interfaces and the host interfaces.

The device interfaces and the host interfaces of an embodiment comprise an encapsulation protocol for Peripheral Component Interconnect Express (PCIe) traffic to traverse the transport fabric.

The device interfaces and the host interfaces of an embodiment comprise a decapsulation protocol for PCIe traffic to traverse the transport fabric.

The MCPU of an embodiment discovers and enumerates the plurality of independent IO devices.

At least one of the plurality of independent IO devices of an embodiment is hot-plugged during system operation.

The MCPU of an embodiment initializes the plurality of independent IO devices.

The MCPU of an embodiment runs a privileged driver for each IO device of the plurality of independent IO devices, wherein the privileged driver controls the IO device.

The plurality of independent IO devices of an embodiment include an IO device with one endpoint function (EPF), wherein the MCPU assigns the IO device with one EPF to a single host computer, wherein the single host computer has control over the EPF.

The plurality of independent IO devices of an embodiment include an IO device with a plurality of endpoint functions (EPFs), wherein the IO device with the plurality of EPFs is shared across a set of host computers of the plurality of independent host computers.

A privileged driver of the MCPU of an embodiment controls a physical EPF of the IO device with the plurality of EPFs.

Virtual EPFs assigned to host computers of the set of host computers of an embodiment are controlled by non-privileged drivers of the assigned host computers.

Non-privileged physical EPFs assigned to host computers of the set of host computers of an embodiment are controlled by non-privileged drivers of the assigned host computers.

Each host computer of an embodiment comprises a proxy including configuration data.

The configuration data of an embodiment comprises a bus-device-function (BDF) number in a domain of the host computer.

The configuration data of an embodiment comprises a memory range identifier.

The configuration data of an embodiment comprises an endpoint function (EPF) identifier of an EPF of at least one IO device reserved for use by the corresponding host computer.

The configuration data of an embodiment comprises a destination address of a device interface corresponding to an endpoint function (EPF) of at least one IO device reserved for use by the corresponding host computer.

Configuration accesses to the proxy of an embodiment are directed to the MCPU, wherein the MCPU controls configuration of the EPF and updates the host computer with current configuration status.

The IO accesses to the proxy of an embodiment are sent directly to the IO device via the transport fabric.

The host interface of an embodiment comprises a PCIe device enabling communications between the plurality of independent host computers.

The communications of an embodiment comprise memory-oriented communications and connection-oriented communications.

Each device interface of an embodiment couples to the IO device of the plurality of independent IO devices via a native device driver of the IO device.

Embodiments described herein include a system comprising: a plurality of device interfaces coupled to transport fabric and to a plurality of independent input/output (IO) devices, wherein each device interface couples to the IO device of the plurality of independent IO devices; and a plurality of host interfaces coupled to the transport fabric, wherein each host interface couples to a host computer of a plurality of independent host computers and exposes functions of the plurality of independent IO devices to the host computer.

The plurality of independent IO devices of an embodiment is coupled to the transport fabric using a Peripheral Component Interconnect Express (PCIe) interface.

The device interfaces and the host interfaces of an embodiment comprise an encapsulation protocol for Peripheral Component Interconnect Express (PCIe) traffic to traverse the transport fabric.

The device interfaces and the host interfaces of an embodiment comprise a decapsulation protocol for PCIe traffic to traverse the transport fabric.

The system of an embodiment comprises a privileged driver for each IO device of the plurality of independent IO devices, wherein the privileged driver controls the IO device.

The plurality of independent IO devices of an embodiment include an IO device with one endpoint function (EPF), wherein the IO device with one EPF is used by a single host computer that controls the EPF.

The plurality of independent IO devices of an embodiment include an IO device with a plurality of endpoint functions (EPFs), wherein the IO device with the plurality of EPFs is shared across a set of host computers of the plurality of independent host computers.

A privileged driver of an embodiment controls a physical EPF of the IO device with the plurality of EPFs.

Virtual EPFs assigned to host computers of the set of host computers of an embodiment are controlled by non-privileged drivers of the assigned host computers.

Non-privileged physical EPFs assigned to host computers of the set of host computers of an embodiment are controlled by non-privileged drivers of the assigned host computers.

Each host computer of an embodiment comprises a proxy including configuration data.

The configuration data of an embodiment comprises a bus-device-function (BDF) number in a domain of the host computer.

The configuration data of an embodiment comprises a memory range identifier.

The configuration data of an embodiment comprises an endpoint function (EPF) identifier of an EPF of at least one IO device reserved for use by the corresponding host computer.

The configuration data of an embodiment comprises a destination address of a device interface corresponding to an endpoint function (EPF) of at least one IO device reserved for use by the corresponding host computer.

Embodiments described herein include a method comprising: coupling a plurality of device interfaces to transport fabric and to a plurality of independent input/output (IO) devices, the coupling including each device interface coupling to the IO device of the plurality of independent IO devices; coupling a plurality of host interfaces to the transport fabric, the coupling including each host interface coupling to a host computer of a plurality of independent host computers; and exposing functions of the plurality of independent IO devices to the plurality of independent host computers via the plurality of device interfaces and the plurality of host interfaces.

The method of coupling the plurality of independent IO devices to the transport fabric of an embodiment comprises a Peripheral Component Interconnect Express (PCIe) interface.

The method of an embodiment comprises initializing the transport fabric, the device interfaces, and the host interfaces.

The method of an embodiment comprises initializing the device interfaces and the host interfaces.

The method of an embodiment comprises an encapsulation protocol for Peripheral Component Interconnect Express (PCIe) traffic to traverse the transport fabric, wherein the device interfaces and the host interfaces include the encapsulation protocol.

The method of an embodiment comprises a decapsulation protocol for PCIe traffic to traverse the transport fabric, wherein the device interfaces and the host interfaces include the decapsulation protocol.

The method of an embodiment comprises discovering the plurality of independent IO devices.

The method of an embodiment comprises enumerating the plurality of independent IO devices.

The method of an embodiment comprises initializing the plurality of independent IO devices.

The method of an embodiment comprises running a privileged driver for each IO device of the plurality of independent IO devices, the privileged driver controlling the IO device.

The method of an embodiment comprises assigning an IO device having one endpoint function (EPF) to a single host computer, the single host computer controlling the EPF, the plurality of independent IO devices including the IO device with one EPF.

The method of an embodiment comprises sharing an IO device having a plurality of endpoint functions (EPFs) across a set of host computers of the plurality of independent host computers, the plurality of independent IO devices including the IO device with the plurality of EPFs.

The method of an embodiment comprises using a privileged driver to control a physical EPF of the IO device with the plurality of EPFs.

The method of an embodiment comprises using non-privileged drivers of the assigned host computers to control virtual EPFs assigned to host computers of the set of host computers.

The method of an embodiment comprises using non-privileged drivers of the assigned host computer to control non-privileged physical EPFs assigned to host computers of the set of host computers.

The method of an embodiment comprises providing a proxy corresponding to each host computer, the proxy including configuration data.

The method of an embodiment comprises controlling configuration of at least one endpoint function (EPF) of at least one IO device reserved for use by the corresponding host computer and updating the host computer.

The configuration data of the method an embodiment comprises a bus-device-function (BDF) number in a domain of the host computer.

The configuration data of the method of an embodiment comprises a memory range identifier.

The configuration data of the method of an embodiment comprises an endpoint function (EPF) identifier of an EPF of at least one IO device reserved for use by the corresponding host computer.

The configuration data of the method of an embodiment comprises a destination address of a device interface corresponding to an endpoint function (EPF) of at least one IO device reserved for use by the corresponding host computer.

Networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The IOV system can be a component of a single system, multiple systems, and/or geographically separate systems. The IOV system can also be a subcomponent or subsystem of a single system, multiple systems, and/or geographically separate systems. The IOV system can be coupled to one or more other components (not shown) of a host system or a system coupled to the host system.

One or more components of the IOV system and/or a corresponding system or application to which the IOV system is coupled or connected include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the IOV system can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the IOV system and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the IOV system and corresponding systems and methods include: microcontrollers with memory (such as electronically erasable programmable read only memory (EEPROM)), embedded microprocessors, firmware, software, etc. Furthermore, aspects of the IOV system and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the IOV system and corresponding systems and methods is not intended to be exhaustive or to limit the systems and methods to the precise forms disclosed. While specific embodiments of, and examples for, the IOV system and corresponding systems and methods are described herein for illustrative purposes, various equivalent modifications are possible within the scope of the systems and methods, as those skilled in the relevant art will recognize. The teachings of the IOV system and corresponding systems and methods provided herein can be applied to other systems and methods, not only for the systems and methods described above.

The elements and acts of the various embodiments described above can be combined to provide further embodiments. These and other changes can be made to the IOV system and corresponding systems and methods in light of the above detailed description.

In general, in the following claims, the terms used should not be construed to limit the IOV system and corresponding systems and methods to the specific embodiments disclosed in the specification and the claims, but should be construed to include all systems that operate under the claims. Accordingly, the IOV system and corresponding systems and methods is not limited by the disclosure, but instead the scope is to be determined entirely by the claims.

While certain aspects of the IOV system and corresponding systems and methods are presented below in certain claim forms, the inventors contemplate the various aspects of the IOV system and corresponding systems and methods in any number of claim forms. Accordingly, the inventors reserve the right to add additional claims after filing the application to pursue such additional claim forms for other aspects of the IOV system and corresponding systems and methods.

What is claimed is:

1. A system comprising:
a management central processor unit (MCPU) coupled to a transport fabric;
a plurality of device interfaces coupled to the transport fabric and to a plurality of independent input/output (IO) devices, wherein each device interface of the plurality of device interfaces couples to a corresponding IO device of the plurality of independent IO devices;
a plurality of host interfaces coupled to the transport fabric, wherein each host interface of the plurality of host interface couples to a corresponding host computer of a plurality of independent host computers and selectively exposes functions of the plurality of independent IO devices to the host computer;
wherein the plurality of device interfaces and the plurality of host interfaces are configured to encapsulate packets provided to the transport fabric and decapsulate packets received from the transport fabric; and
wherein the MCPU is configured to enumerate end point functions provided by the plurality of independent IO devices, receive a request to assign a particular end point function to a selected host, assign the particular end point function to the selected host, and initiate a hot-plug event for the particular end point function on the selected host.

2. The system of claim 1, wherein the plurality of independent IO devices are coupled to the transport fabric using a Peripheral Component Interconnect Express (PCIe) interface.

3. The system of claim 1, wherein the MCPU is connected directly to the transport fabric.

4. The system of claim 1, wherein the MCPU is coupled to the transport fabric with a management interface.

5. The system of claim 1, wherein the MCPU initializes the transport fabric, the device interfaces, and the host interfaces.

6. The system of claim 1, wherein the MCPU initializes the device interfaces and the host interfaces.

7. The system of claim 1, wherein the device interfaces and the host interfaces are configured to execute an encapsulation protocol for Peripheral Component Interconnect Express (PCIe) traffic to traverse the transport fabric.

8. The system of claim 1, wherein the device interfaces and the host interfaces are configured to execute a decapsulation protocol for PCIe traffic to traverse the transport fabric.

9. The system of claim 1, wherein the MCPU discovers and enumerates the plurality of independent IO devices.

10. The system of claim 9, wherein at least one of the plurality of independent IO devices is hot-plugged during system operation.

11. The system of claim 9, wherein the MCPU initializes the plurality of independent IO devices.

12. The system of claim 11, wherein the MCPU runs a privileged driver for each IO device of the plurality of independent IO devices, wherein the privileged driver controls the IO device.

13. The system of claim 1, wherein the plurality of independent IO devices include an IO device with one endpoint function (EPF), wherein the MCPU assigns the IO device with one EPF to a single host computer, wherein the single host computer has control over the EPF.

14. The system of claim 1, wherein the plurality of independent IO devices include an IO device with a plurality of endpoint functions (EPFs), wherein the IO device with the plurality of EPFs is shared across a set of host computers of the plurality of independent host computers.

15. The system of claim 14, wherein a privileged driver of the MCPU controls a physical EPF of the IO device with the plurality of EPFs.

16. The system of claim 14, wherein virtual EPFs assigned to host computers of the set of host computers are controlled by non-privileged drivers of the assigned host computers.

17. The system of claim 14, wherein non-privileged physical EPFs assigned to host computers of the set of host computers are controlled by non-privileged drivers of the assigned host computers.

18. The system of claim 1, wherein each host interface comprises a proxy including configuration data.

19. The system of claim 18, wherein the configuration data comprises a bus-device-function (BDF) number in a domain of the host computer.

20. The system of claim 18, wherein the configuration data comprises a memory range identifier.

21. The system of claim 18, wherein the configuration data comprises an endpoint function (EPF) identifier of an EPF of at least one IO device reserved for use by the corresponding host computer.

22. The system of claim 18, wherein the configuration data comprises a destination address of a device interface corresponding to an endpoint function (EPF) of at least one IO device reserved for use by the corresponding host computer.

23. The system of claim 18, wherein configuration accesses to the proxy are directed to the MCPU, wherein the MCPU controls configuration of the EPF and updates the host computer with current configuration status.

24. The system of claim 18, wherein IO accesses to the proxy are sent directly to the IO device via the transport fabric.

25. The system of claim 1, wherein the host interface comprises a PCIe device enabling communications between the plurality of independent host computers.

26. The system of claim 25, wherein the communications comprise memory-oriented communications and connection-oriented communications.

27. The system of claim 1, wherein each device interface couples to the corresponding IO device of the plurality of independent IO devices via a native device driver of the IO device.

28. A system comprising:
a plurality of device interfaces coupled to transport fabric and to a plurality of independent input/output (IO) devices, wherein each device interface couples to the a corresponding IO device of the plurality of independent IO devices;
a plurality of host interfaces coupled to the transport fabric, wherein each host interface is configured to function as a proxy device and selectively expose at least one end point function provided by the plurality of independent IO devices to a corresponding host computer coupled the host interface;
wherein the plurality of device interfaces and the plurality of host interfaces are configured to encapsulate packets provided to the transport fabric and decapsulate packets received from the transport fabric.

29. The system of claim 28, wherein the plurality of independent IO devices are coupled to the transport fabric using a Peripheral Component Interconnect Express (PCIe) interface.

30. The system of claim 28, wherein the device interfaces and the host interfaces are configured to execute an encapsulation protocol for Peripheral Component Interconnect Express (PCIe) traffic to traverse the transport fabric.

31. The system of claim 28, wherein the device interfaces and the host interfaces are configured to execute a decapsulation protocol for PCIe traffic to traverse the transport fabric.

32. The system of claim 28, comprising a privileged driver for each IO device of the plurality of independent IO devices, wherein the privileged driver controls the IO device.

33. The system of claim 28, wherein each host interface is further configured to send virtual plug events to the corresponding host computer.

34. The system of claim 28, wherein the plurality of independent IO devices include an IO device with a plurality of endpoint functions (EPFs), wherein the IO device with the plurality of EPFs is shared across a set of host computers of the plurality of independent host computers.

35. The system of claim 34, wherein a privileged driver controls a physical EPF of the IO device with the plurality of EPFs.

36. The system of claim 34, wherein virtual EPFs assigned to host computers of the set of host computers are controlled by non-privileged drivers of the assigned host computers.

37. The system of claim 34, wherein non-privileged physical EPFs assigned to host computers of the set of host computers are controlled by non-privileged drivers of the assigned host computers.

38. The system of claim 28, wherein each host interface comprises a proxy including configuration data.

39. The system of claim 38, wherein the configuration data comprises a bus-device-function (BDF) number in a domain of the host computer.

40. The system of claim 38, wherein the configuration data comprises a memory range identifier.

41. The system of claim 38, wherein the configuration data comprises an endpoint function (EPF) identifier of an EPF of at least one IO device reserved for use by the corresponding host computer.

42. The system of claim 38, wherein the configuration data comprises a destination address of a device interface corresponding to an endpoint function (EPF) of at least one IO device reserved for use by the corresponding host computer.

43. A method comprising:
coupling a plurality of device interfaces to a transport fabric and to a plurality of independent input/output (IO) devices, the coupling including coupling each device interface to a corresponding IO device of the plurality of independent IO devices;
coupling a plurality of host interfaces to the transport fabric, the coupling including coupling each host interface to a host computer of a plurality of independent host computers;
selectively exposing at least one end point function provided by the plurality of independent IO devices to a host computer coupled to a host interface;
enumerating end point functions provided by the plurality of independent IO devices, receiving a request to assign a particular end point function to a selected host, assigning the particular end point function to the selected host, and initiating a hot-plug event for the particular end point function on the selected host; and
encapsulating packets provided to the transport fabric and decapsulating packets received from the transport fabric in the plurality of device interfaces and the plurality of host interfaces.

44. The method of claim 43, wherein the coupling of the plurality of independent IO devices to the transport fabric comprises a Peripheral Component Interconnect Express (PCIe) interface.

45. The method of claim 43, comprising initializing the transport fabric, the device interfaces, and the host interfaces.

46. The method of claim 43, comprising initializing the device interfaces and the host interfaces.

47. The method of claim 43, comprising executing an encapsulation protocol for Peripheral Component Interconnect Express (PCIe) traffic to traverse the transport fabric, wherein the device interfaces and the host interfaces execute the encapsulation protocol.

48. The method of claim 43, comprising executing a decapsulation protocol for PCIe traffic to traverse the transport fabric, wherein the device interfaces and the host interfaces execute the decapsulation protocol.

49. The method of claim 43, comprising discovering the plurality of independent IO devices.

50. The method of claim 43, comprising enumerating the plurality of independent IO devices.

51. The method of claim 43, comprising initializing the plurality of independent IO devices.

52. The method of claim 43, comprising running a privileged driver for each IO device of the plurality of independent IO devices, the privileged driver controlling the IO device.

53. The method of claim 43, comprising assigning an IO device having one endpoint function (EPF) to a single host computer, the single host computer controlling the EPF, the plurality of independent IO devices including the IO device with one EPF.

54. The method of claim 43, comprising sharing an IO device having a plurality of endpoint functions (EPFs) across a set of host computers of the plurality of independent host computers, the plurality of independent IO devices including the IO device with the plurality of EPFs.

55. The method of claim 54, comprising, using a privileged driver, controlling a physical EPF of the IO device with the plurality of EPFs.

56. The method of claim 54, comprising, using non-privileged drivers of the assigned host computers, controlling virtual EPFs assigned to host computers of the set of host computers.

57. The method of claim 54, comprising, using non-privileged drivers of the assigned host computer, controlling non-privileged physical EPFs assigned to host computers of the set of host computers.

58. The method of claim 43, comprising providing a proxy corresponding to each host computer, the proxy including configuration data.

59. The method of claim 58, comprising controlling configuration of at least one endpoint function (EPF) of at least one IO device reserved for use by the corresponding host computer and updating the host computer.

60. The method of claim 58, wherein the configuration data comprises a bus-device-function (BDF) number in a domain of the host computer.

61. The method of claim 58, wherein the configuration data comprises a memory range identifier.

62. The method of claim 58, wherein the configuration data comprises an endpoint function (EPF) identifier of an EPF of at least one IO device reserved for use by the corresponding host computer.

63. The method of claim 58, wherein the configuration data comprises a destination address of a device interface corresponding to an endpoint function (EPF) of at least one IO device reserved for use by the corresponding host computer.

* * * * *